US007023771B2

(12) United States Patent
Takata et al.

(10) Patent No.: US 7,023,771 B2
(45) Date of Patent: Apr. 4, 2006

(54) OPTICAL INFORMATION RECORDING APPARATUS

(75) Inventors: Shinichi Takata, Saitama (JP);
Yoshihiro Kitano, Saitama (JP);
Yoshitaka Hasunuma, Saitama (JP);
Wataru Hasegawa, Saitama (JP);
Hiroyuki Takahashi, Saitama (JP)

(73) Assignee: Pioneer Corporation, Tokyo (JP)

( * ) Notice: Subject to any disclaimer, the term of this patent is extended or adjusted under 35 U.S.C. 154(b) by 41 days.

(21) Appl. No.: 10/911,634

(22) Filed: Aug. 5, 2004

(65) Prior Publication Data

US 2005/0094513 A1   May 5, 2005

(30) Foreign Application Priority Data

Aug. 6, 2003   (JP) ............................ P2003-206337

(51) Int. Cl.
*G11B 5/09*   (2006.01)
(52) U.S. Cl. ................ 369/47.5; 369/47.32; 369/53.31
(58) Field of Classification Search ............... 369/47.5, 369/47.32, 47.51, 53.31, 53.41, 53.44, 59.11, 369/100, 116, 47.53, 121
See application file for complete search history.

(56) References Cited

U.S. PATENT DOCUMENTS 6,205,102 B1 *   3/2001   Spruit ..................... 369/59.11

FOREIGN PATENT DOCUMENTS

JP   2002-42361 A   2/2002

\* cited by examiner

*Primary Examiner*—Ali Neyzari
(74) *Attorney, Agent, or Firm*—Sughrue Mion, PLLC

(57) ABSTRACT

An optical information recording apparatus includes an emission output information acquisition section for acquiring information about a drive current employed for controlling a beam output from an information recording section; a cooling determination section for determining whether to cool the information recording section in accordance with the information about the emission output acquired by the emission output information acquisition section; and a cooling execution section for cooling the information recording section when the cooling determination section has determined that cooling should be performed.

18 Claims, 7 Drawing Sheets

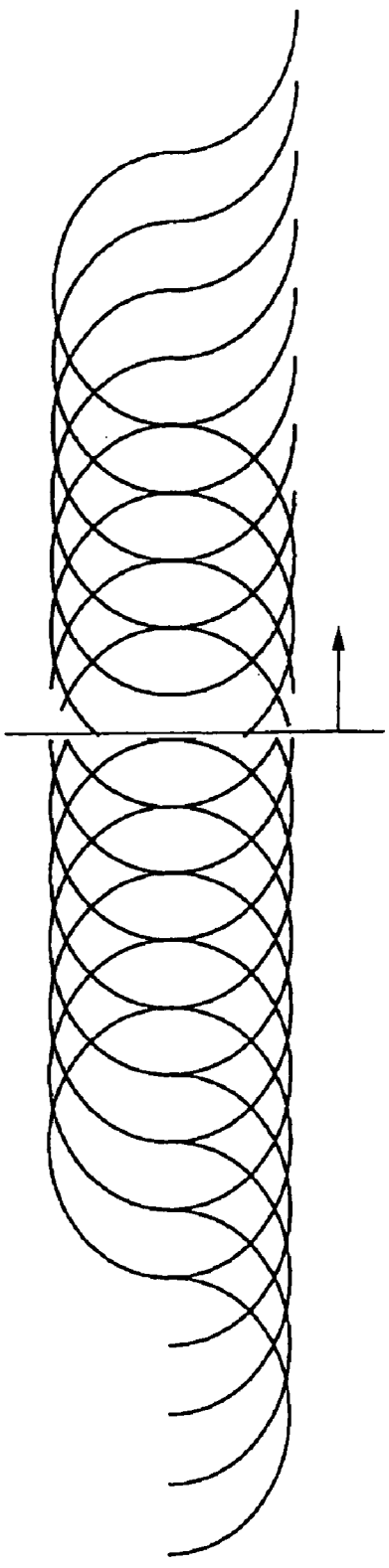
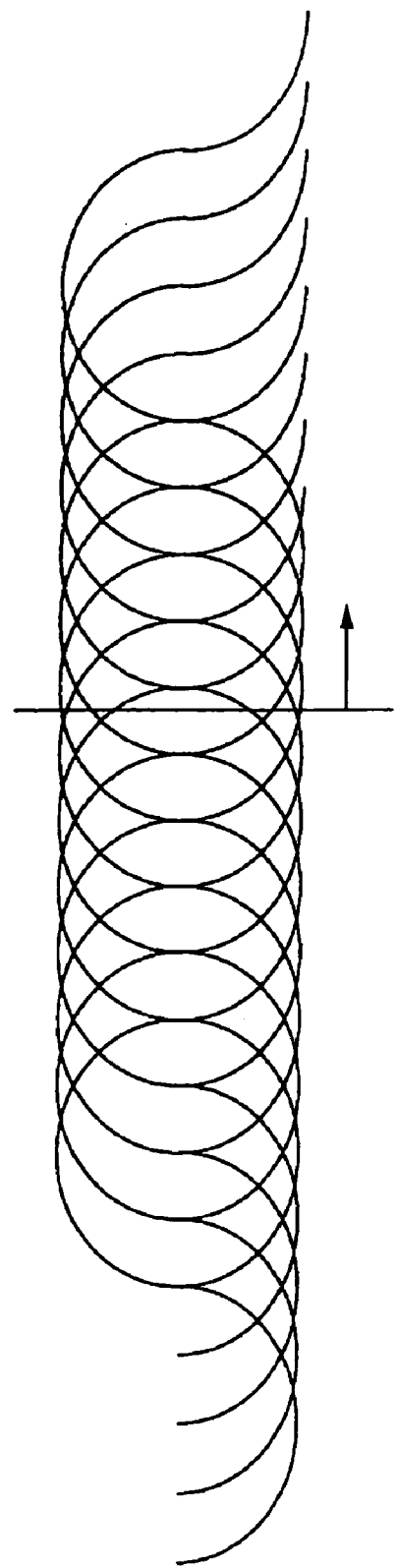
FIG. 3A
FIG. 3B

FIG. 5

TEMPERATURE-EMISSION OUTPUT CONTOL VALUE

| TEMPERATURE OF PICKUP | EMISSION OUTPUT CONTROL VALUE |
|---|---|
| 64°C | – |
| 65°C | – |
| 66°C | AEh |
| 67°C | B0h |
| 68°C | B2h |
| 69°C | B4h |
| 70°C | B6h |
| 71°C | B8h |
| 72°C | BAh |
| 73°C | BCh |
| 74°C | BEh |
| 75°C | C0h |

OPTICAL INFORMATION RECORDING APPARATUS

BACKGROUND OF THE INVENTION

1. Field of the Invention

The present invention relates to an optical information recording apparatus.

2. Description of the Related Art

In order to record information on an optical disk (an optical recording medium), such as a CD (Compact Disk) or a DVD (Digital Versatile Disk), at high speed, there recently exists an ever-growing desire to develop an information recording section, such as a pickup, which emits a high-output beam. However, the higher the output of the emitted beam, the greater a heating value, and hence a technique for efficiently cooling the information recording section is required.

For this reason, for example, JP-A-2002-42361 discloses a disk apparatus which cools a pickup by utilization of an air current stemming from rotation of an optical disk when the pickup has become overheated.

However, the related-art typified by JP-A-2002-42361 merely refers to a portion of a cooling method. JP-A-2002-42361 suffers problems; that is, failure to disclose in sufficient technical-detail requirements for determining whether or not cooling is to be carried out, a method for restoring information recording operation after cooling operation, and a method for more smoothly, efficiently carrying out cooling operation.

SUMMARY OF THE INVENTION

It is an object of the invention to provide with optical information recording apparatus capable of more smoothly and efficiently cooling an information recording section which records information by emitting a beam on an optical recording medium.

According to first aspect of the invention, an optical information recording apparatus having an information recording section for recording information by emitting a beam on an optical recording medium, the recording apparatus being characterized by comprising emission output information acquisition device for acquiring information about an emission output of a beam from the information recording section; a cooling determination section for determining whether to cool the information recording section, on the basis of the information about the emission output acquired by the emission output information acquisition device; and cooling execution device for cooling the information recording section in accordance with a result of determination of the cooling determination device.

According to second aspect of the invention, an optical information recording apparatus having an information recording section for recording information by emitting a beam on an optical recording medium, the recording apparatus being characterized by comprising temperature information acquisition device for acquiring information about the temperature of the information recording section; a cooling determination device for determining whether to cool the information recording section, on the basis of information about the temperature acquired by the temperature information acquisition device; cooling execution device for cooling the information recording section in accordance with a result of determination of the cooling determination device; and output correction device which corrects an emission output of a beam from the information recording section when recording of information on the optical recording medium is resumed after the cooling execution device has performed cooling of the information recording section.

BRIEF DESCRIPTION OF THE DRAWINGS

These and other objects and advantages of this invention will become more fully apparent from the following detailed description taken with the accompanying drawings in which:

FIGS. 3A and 3B are conceptual renderings showing the state of an RF signal obtained when data recording operation has been interrupted by cooling operation and is subsequently resumed;

FIG. 5 is a view showing an example relationship between the temperature of a pickup achieved during recording of data and an emission output control value employed for controlling an emission output of a laser diode;

DESCRIPTION OF THE PREFERRED EMBODIMENTS

A preferred embodiment of an optical information recording apparatus according to the present invention will be described hereinbelow by reference to the accompanying drawings. In the following descriptions, after principal terminology used in the embodiment has been described, the outline and features of the present embodiment and an example of the embodiment will be described. Finally, various modifications of the embodiment and those of the example will be described.

The principal terminology used in the present embodiment will first be described. The term "an optical recording medium" will be referred to as an "optical disk," as required and employed herein refers to an information recording medium on and from which information (hereinafter referred to as "data," as required) is reproduced. More specifically, a BD (Blue-ray Disk), a DVD-R (Digital Versatile Disk Recordable), a DVD-RW (Digital versatile Disk Rewritable), a DVD-RAM (Digital Versatile Disk Random Access Memory), a CD-R (Compact Disk Recordable), a CD-RW (Compact Disk Rewritable), and an AOD (Advanced Optical Disk) correspond to the information recording medium.

Here, the term "optical information recording apparatus" indicates an apparatus for recording information (or data) on the optical recording medium. Specifically, an apparatus for recording information on the previously-described BD, DVD-R, DVD-RW, DVD-RAM, CD-R, CD-RW, AOD, or the like corresponds to the optical information recording apparatus.

The term "information recording section" employed in the embodiment refers to a recording section for recording information by emitting a beam onto the optical recording medium. Specifically, a pickup, a head, or a laser diode, which are employed for recording information on the previously-described BD, DVD-R, DVD-RW, DVD-RAM, CD-R, CD-RW, and AOD, correspond to the recording section.

Figure 1:
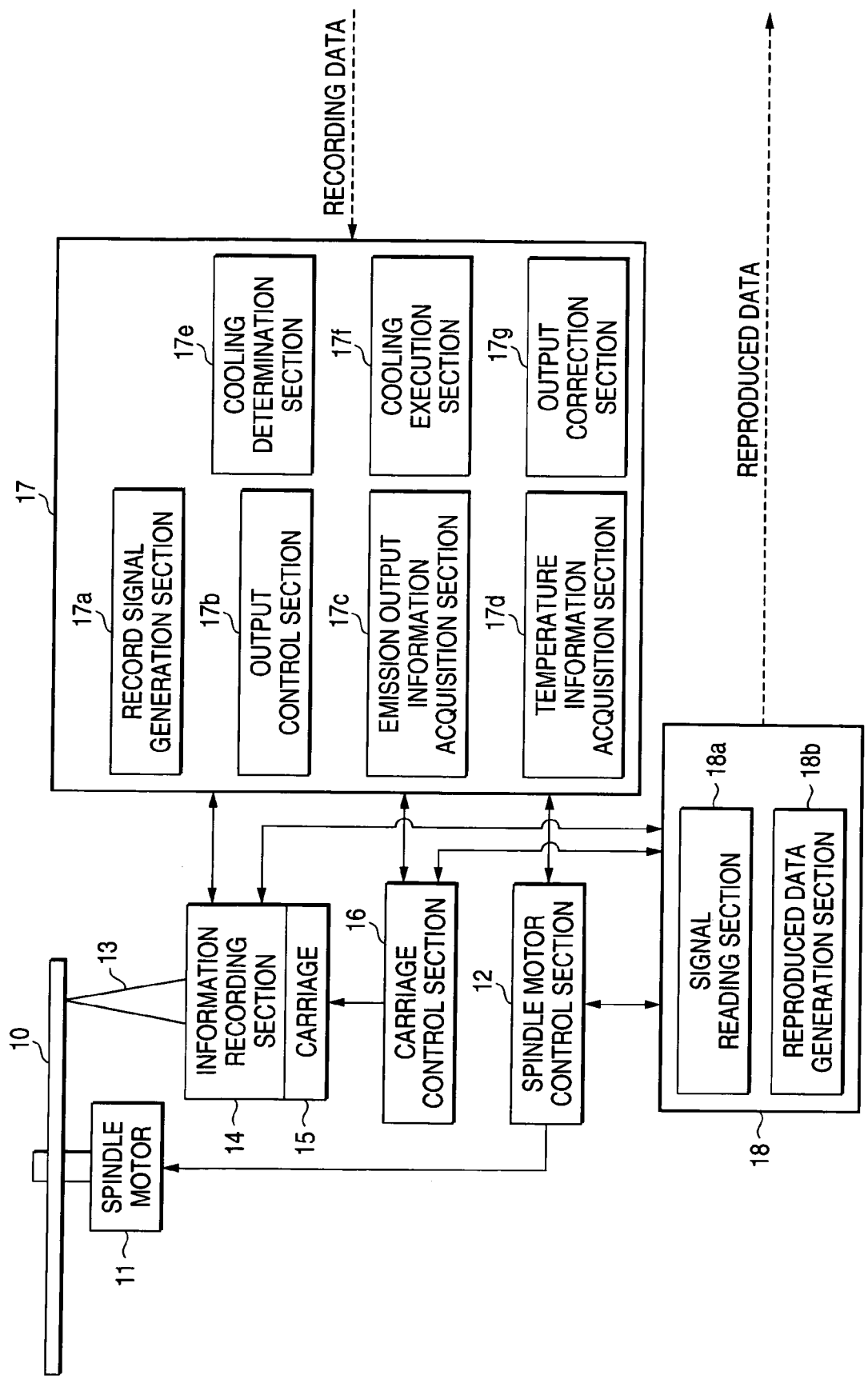
FIG. 1 is a block diagram showing functional configuration of an optical information recording apparatus according to an embodiment of the invention.
Figure 2:
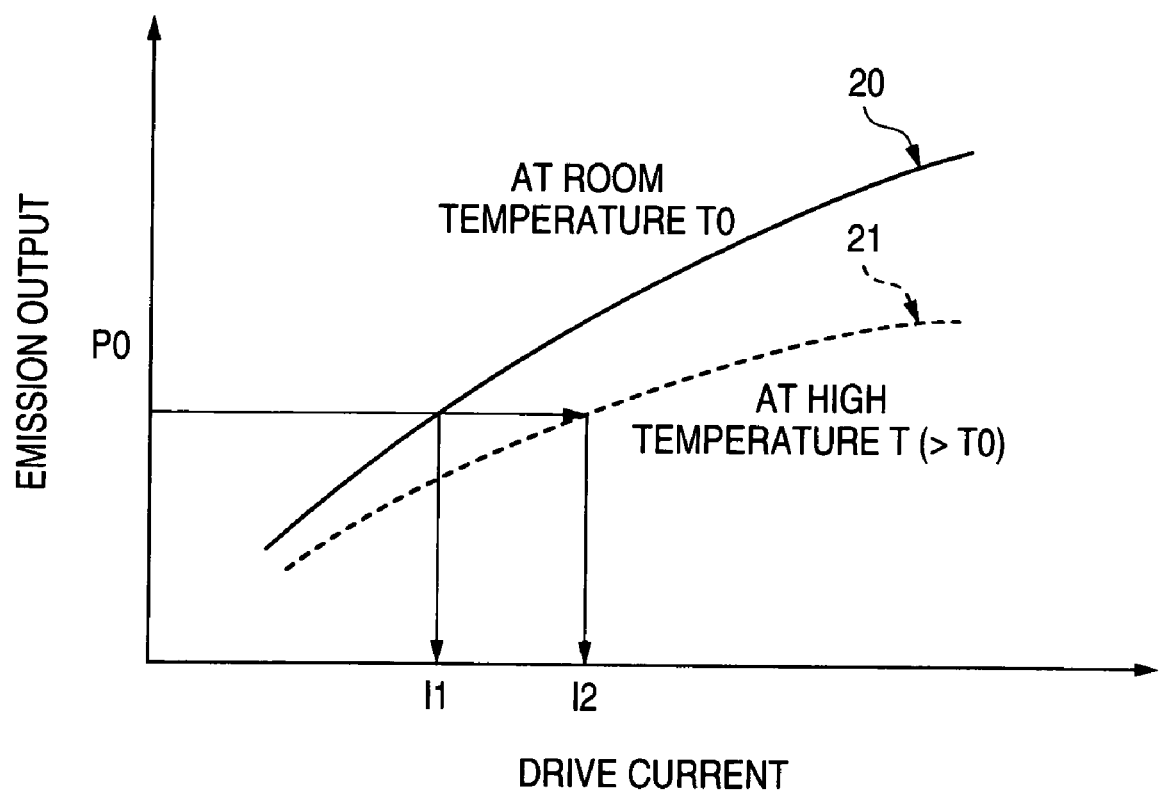
FIG. 2 is a view for describing temperature dependency in connection with a relationship between an emission output and drive current value of a light beam from an information recording section.

By reference to FIGS. 1 through 3, the outline and features of an optical information recording apparatus according to the embodiment will be described. FIG. 1 is a block diagram showing the functional configuration of the optical information recording apparatus of the embodiment. Briefly, the optical information recording apparatus is schematically an apparatus for recording information on an optical disk 10 or reproducing data from the optical disk 10.

As illustrated, the optical information recording apparatus has a spindle motor 11, a spindle motor control section 12, an information recording section 14, a carriage 15, a carriage control section 16, a record control section 17, and a reproduction control section 18.

The spindle motor 11 is a motor for rotating the optical disk 10, and the spindle motor control section 12 is a control section for controlling the rotational speed of the spindle motor 11. The information recording section 14 is a recording section which has device for emitting an optical beam, such as a laser diode, and records or reads data by emitting a light beam 13 on the optical disk 10.

The carriage 15 is a base which supports the information recording section 14. The carriage control section 16 is a control section which moves the information recording section 14 to an appropriate data recording or reading position by actuating the carriage 15.

The record control section 17 is a control section which performs operation for receiving recording data to be recorded on the optical disk 10 and recording the thus-received data on the optical disk 10. The record control section 17 not only controls recording of data but also determines whether or not to carry out cooling operation, on the basis of a determination as to which one of emission outputs stored in the information recording section 14 has satisfied predetermined requirements. When a determination is made that cooling operation is to be carried out, cooling of the information recording section 14 is performed.

The term "emission outputs" includes a control signal for instructing the record control section 17 to emit the light beam 13, and a drive current employed by the information recording section 14 to actually emit the light beam 13 in accordance with the control signal.

There will now be described temperature dependency in a relationship between an output of the light beam 13 emitted from the information recording section 14 and the drive current. As shown in FIG. 2, device for emitting a light beam, such as a laser diode, generally has temperature dependency in a relationship between an output of an emitting light beam and the drive current. As illustrated, a relationship curve 20 existing between an emission output and a drive current at room temperature T0 requires a drive current I1 to acquire an emission output P0 of the light beam 13.

However, when the temperature of the information recording section 14 reaches a higher temperature T (T>0), a much greater drive current I2 is required to obtain the same emission output P0, as indicated by a relationship curve 21 existing at temperature T between the emission output and the drive current. AS the temperature of the information recording section 14 increases, the drive current also becomes greater, and hence the drive current can also act as an index indicating an increase in the temperature of the information recording section 14.

From the above descriptions, the record control section 17 can smoothly and efficiently shift to cooling operation by immediately detecting an increase in the temperature of the information recording section 14 through detection of an emission output, as well as merely measuring the temperature of the information recording section 14.

The record control section 17 controls the information recording section 14 so that it can smoothly return to operation for recording data after cooling of the information recording section 14 has been completed. Specifically, when shifting to the cooling operation after having aborted data recording operation, the record control section 17 stores information about an addendum of the data for which the recording operation has been aborted. When cooling of the information recording section 14 and the data recording operation are resumed, recording of information is resumed on the basis of the information about the stored addendum of the data. Here, the term "information about an addendum of data" refers to information about an address into which the data are additionally stored and information about a position in a sector of the optical disk 10 where data are additionally stored and a timing at which additional data are to be recorded.

FIGS. 3A and 3B are conceptual renderings showing the state of an RF signal achieved when data recording operation has been interrupted by the cooling operation and the data recording operation is then resumed. FIG. 3A shows the state of the RF signal when information about the addendum of the data has not been utilized at the time of resumption of the data recording operation, and FIG. 3B shows the state of the RF signal when information about the addendum of the data has been utilized.

As shown in FIG. 3A, when the information about the addendum of the data has not been utilized, the RF signal is not smoothly connected, thereby resulting in occurrence of an error in the data recording operation. In contrast, as shown in FIG. 3B, when the information about the addendum of the data has been utilized, the RF signal can be connected without interruption after resumption of the recording operation.

When cooling of the information recording section 14 is performed and when recording of data on the optical disk 10 is resumed, the record control section 17 performs operation for correcting an emission output of the information recording section 14.

As has been described in connection with FIG. 2, even when the same drive current as that used when the recording operation has been interrupted is input, the temperature of the information recording section 14 has already been decreased by cooling. An emission output becomes greater than that achieved at the time of interruption of the recording operation, and the emitted optical beam 13 may exceed the appropriate value. Therefore, a corrected, appropriate emission output can be obtained by setting a drive current in accordance with the temperature of the information recording section 14 achieved at the time of resumption of recording operation.

The record control section 17 comprises a recording signal generation section 17a, an output control section 17b, an emission output information acquisition section 17c, a temperature information acquisition section 17d, a cooling determination section 17e, a cooling execution section 17f, and an output correction section 17g.

The recording signal generation section 17a is a generation section which generates a recording signal for the optical disk 10 by receiving record data to be recorded on the optical disk 10 and modulating the thus-received record data. The output control section 17b is a control section which instructs an emission output of the light beam 13 to be emitted from the information recording section 14.

The emission output information acquisition section 17c is an acquisition section for acquiring information about an output of emission from the information recording section 14. The temperature information acquisition section 17d (corresponding to "temperature information acquisition device" described in claims) is an acquisition section for acquiring information about the temperature of the information recording section 14.

The cooling determination section 17e is a determination section which determines whether or not to cool the information recording section 14, on the basis of a determination as to whether either the information about an emission output acquired by the emission output information acquisition section 17c or the information about the temperature acquired by the temperature information acquisition section 17d has satisfied any one of predetermined requirements.

Specifically, when the temperature of the information recording section 14 has reached a predetermined temperature or more or when the emission output from the information recording section 14 has reached a predetermined value or more, the cooling determination section 17e determines that cooling operation should be commenced.

The cooling execution section 17f is an execution section which performs cooling operation when the cooling determination section 17e has determined that cooling of the information recording section 14 should be commenced. Specifically, various methods can be employed in order to perform cooling operation; that is, a method for rotating the optical disk 10 by way of the spindle motor control section 12 and cooling the information recording section by an air current stemming from rotation, a method for stopping supply of electric power to a heat source to be provided for the information recording section 14, and a method for moving the information recording section 14 to a position where a high cooling effect is yielded, by way of the carriage control section 16.

The output correction section 17g is a correction section which corrects the emission output of the information recording section 14 when the cooling execution section 17f performs cooling of the information recording section 14, to thus resume recording of data on the optical disk 10.

A method for correcting the emission output includes a method for performing correcting operation by performing an OPC (Optimum Power Control) operation; a method for correcting an emission output in accordance with the temperature of the information recording section 14 after cooling operation has been performed on the basis of a correspondence between the temperature and emission output of the information recording section 14, which will be described later; and a like method. Here, the term OPC refers to a technique for optimizing recording conditions, such as an emission output, by performing a recording test for a PCA (Power Calibration Area) provided on an inner periphery of the recording area of the optical disk 10.

The reproduction control section 18 is a control section for performing an operation for reading and reproducing the data recorded on the optical disk 10. The reproduction control section 18 has a signal reading section 18a and a reproduced data generation section 18b.

The signal reading section 18a is a control section for reading desired data by controlling the information recording section 14, the carriage control section 15, and the spindle motor control section 16. The reproduced data generation section 18b is a generation section for generating reproduced data by demodulating the data read by the signal reading section 18a. The thus-generated data are transmitted to an unillustrated signal processing circuit at a subsequent stage, where the signal is subjected to signal processing, as required.

As has been described, the optical information recording apparatus according to the embodiment determines whether or not to perform cooling operation, on the basis of a determination as to whether the temperature of the information recording section 14 or the emission output of the information recording section 14 has satisfied any of predetermined conditions. When a determination is made that the cooling operation is to be performed, cooling of the information recording section 14 is performed. Consequently, an increase in the temperature of the information recording section 14 is quickly detected, whereby cooling operation can be commenced smoothly and efficiently.

When proceeding to the cooling operation by aborting recording of data, the optical information recording apparatus of the embodiment stores information about an addendum of the data. When recording of the data is resumed, the data are additionally recorded on the basis of the information about the addendum of the data. Consequently, the RF signal is connected without interruption, thereby inhibiting occurrence of a recording error and enabling smooth resumption of an operation for recording data.

The optical information recording apparatus of the embodiment corrects the emission output of the information recording section 14 when cooling of the information recording section 14 is performed, to thus resume recording of information on the optical disk 10. Consequently, even when a change has arisen in the temperature of the information recording section 14 for reasons of the cooling operation, an appropriate emission output can be obtained when recording of the data is resumed.

In the present embodiment, a determination is rendered as to whether or not cooling operation is to be performed, on the basis of a determination as to whether information about the temperature of the information recording section 14 or information about the emission output of the information recording section has satisfied a predetermined requirement. However, the invention is not always limited to this embodiment. A determination may be made as to whether or not the predetermined requirement has been satisfied by detecting only information about the temperature of the information recording section 14 or information about the emission output.

The present embodiment has described the optical information recording apparatus which records or reproduces data on and from the optical disk 10 of the same type. However, the present invention is not always limited to such an apparatus. The present invention can also be applied to an optical information recording apparatus capable of recording and reproducing data on and from a plurality of types of optical disks 10, such as a CD-R or a DVD-R, in the same manner.

For instance, in the case of an optical information recording apparatus capable of recording data on both a CD-R and a DVD-R, an output from the information recording section 14 is corrected by subjecting the DVD-R to OPC after the information recording section 14 has been cooled. In the case of a CD-R, the output from the information recording section 14 can also be corrected on the basis of a relationship between the temperature and emission output of the information recording section 14, which will be described later, by appropriately setting an emission output from the information recording section 14 after the information recording section 14 has been cooled.

The reason for this is that the number of times the CD-R can be subjected to OPC is drastically smaller than the number of times the DVD-R can be subjected to OPC. As mentioned above, more optimum cooling operation can be implemented by modifying the device for correcting the emission output in consideration of characteristics of the respective optical disks.

The example and various modifications of the previously-described optical information recording apparatus of the embodiment will be described hereinbelow. Detailed descriptions of those constituent portions which are the same as those of the optical information recording apparatus will be omitted.

In relation to the present example, the specific configuration of the optical information recording apparatus having a pickup for recording information on a optical disk and processing operations to be performed by the optical information recording apparatus will be described by reference to FIGS. 4 through 7.

Figure 4:
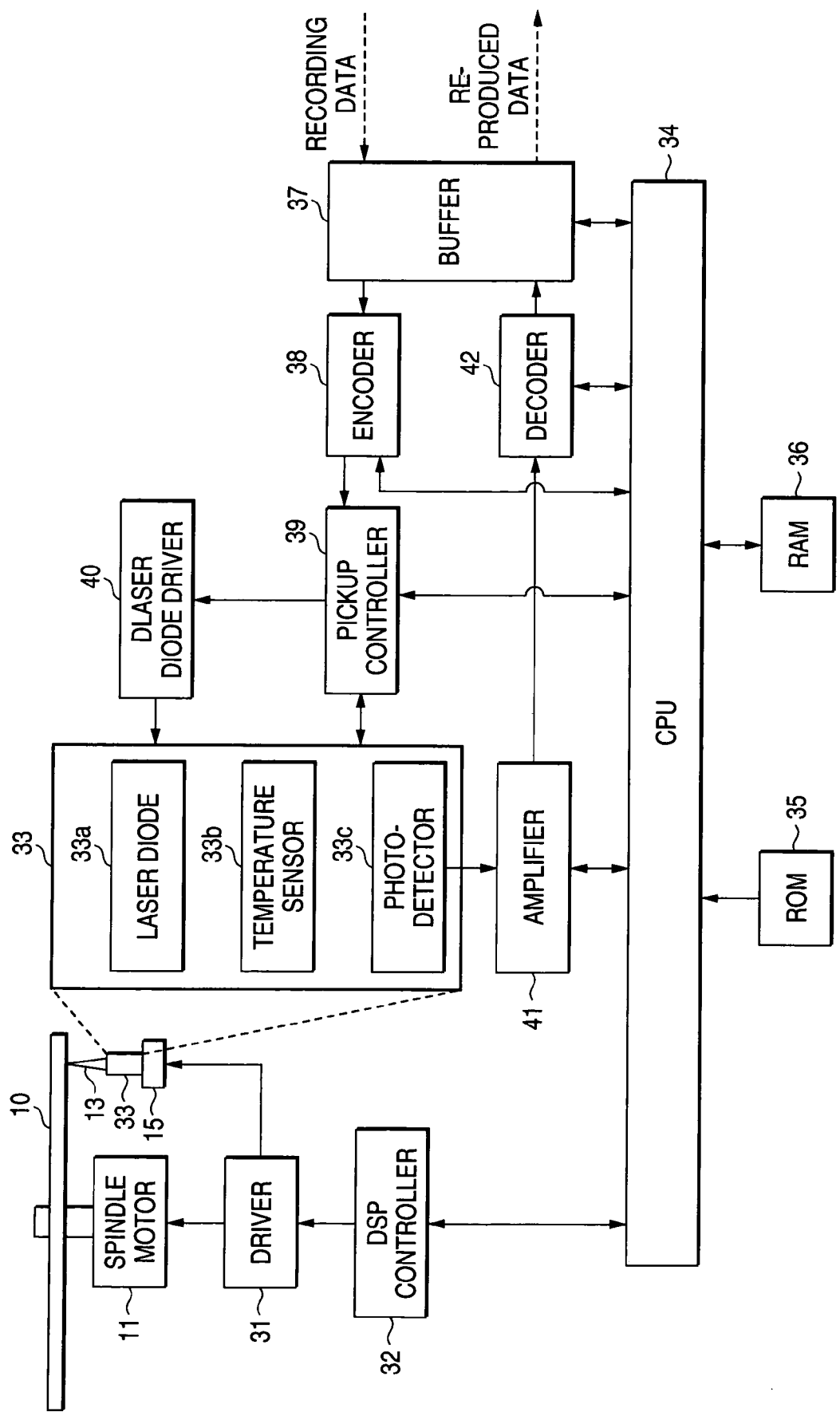
FIG. 4 is a block diagram showing the hardware configuration of the optical information recording apparatus of the present embodiment.

FIG. 4 is a block diagram showing the hardware configuration of the optical information recording apparatus of the present example. The optical information recording apparatus comprises a spindle motor 11; a carriage 15; a driver 31; a DSP controller 32; a pickup 33; a CPU 34; ROM 35; RAM 36; a buffer 37; an encoder 38; a pickup controller 39; a laser diode driver 40; an amplifier 41; and a decoder 42. As shown in an enlarged view of the drawing, the pickup 33 has a laser diode 33a, a temperature sensor 33b, and a photodetector 33c.

Now, there will be described a relationship between the respective function sections shown in FIG. 1 and respective hardware configuration sections shown in FIG. 4. The ROM 35 from which data are read by the CPU 34 and the RAM 36 on and from which data are read and written by the CPU 34 are related to all functional sections that are controlled by the CPU 34, and hence their descriptions are omitted from descriptions about the relationship provided below.

The information recording section 14 corresponds to the laser diode 33a and the photodetector 33c of the pickup 33. The spindle motor control section 12 and the carriage control section 16 correspond to the driver 31, the DSP controller 32, and the CPU 34. The recording signal generation section 17a corresponds to the CPU 34, the buffer 37, and the encoder 38. The output control section 17b corresponds to the CPU 34, the pickup controller 39, and the laser diode driver 40. The emission output information acquisition section 17c corresponds to the CPU 34 and the pickup controller 39. The temperature information acquisition section 17d corresponds to the temperature sensor 33b, the CPU 34, and the pickup controller 39.

The cooling determination section 17e corresponds to the CPU 34. The cooling execution section 17f corresponds to the spindle motor 11, the DSP controller 16, the driver 31, the pickup 33, the CPU 34, the encoder 38, the pickup controller 39, and the laser diode driver 40. The output correction section 17g corresponds to the temperature sensor 33b, the CPU 34, and the pickup controller 39. The signal reading section 18a corresponds to the photodetector 33c, the CPU 34, and the amplifier 41. The reproduced data generation section 18b corresponds to the CPU 34, the buffer 37, and the decoder 42.

The spindle motor 11 is a motor for rotating an optical disk 10. When recording or reproducing data, the spindle motor 11 rotates at a constant linear velocity (CLV). When cooling of the pickup 33 is performed, the spindle motor 11 rotates at a constant angular velocity (CLV). Thereby, there is performed cooling operation by utilization of an air current stemming from rotation. Here, an angular speed of the spindle motor 11 achieved during the course of cooling operation corresponds to an angular speed falling within the range employed during the data recording operation. As a result, processing can smoothly return to the data recording operation.

The pickup 33 is a unit which records or reads data by emitting a light beam 13 on the optical disk 10, and has the laser diode 33a, the temperature sensor 33b, and the photodetector 33c.

The laser diode 33a is a semiconductor light-emitting element which emits the light beam 13. The temperature sensor 33b is a sensor for measuring the temperature of the pickup 33. In the present example, in order to measure the temperature of the laser diode 33a, which is one of a plurality of heat sources, the temperature sensor 33b is disposed in the vicinity of the laser diode 33a. The photodetector 33c is a photodetector which receives the reflected light originating from the light beam 13 emitted to the optical disk 10 and generates an electrical signal in accordance with light density of the reflected light.

The carriage 15 is a base for supporting the pickup 33, and the driver 31 is for controlling the rotational speed of the spindle motor 11 and actuation of the carriage 15 by an electric current. The DSP (Digital Signal Processor) controller 32 is for transmitting, to the driver 31, a control signal instructing the rotational speed of the spindle motor 11 and another control signal for instructing actuation of the carriage 15.

The CPU 34 is a unit for controlling the entirety of the optical information recording apparatus and reads a program stored in the ROM 35 and implements the respective function sections shown in FIG. 1 by executing the program. The CPU 34 stores or reads data in and from the RAM 36.

The buffer 37 is memory which receives, from an unillustrated circuit on a previous stage, recording data to be recorded on the optical disk 10 and which temporarily stores the thus-received recording data. The buffer 37 temporarily stores the data read from the optical disk 10 and transmits the thus-read data to an unillustrated signal processing circuit on a subsequent stage.

The encoder 38 is a circuit which acquires, from the buffer 37, the recording data to be recorded on the optical disk 10 and which subjects the recording data to encoding operation. Further, the encoder 38 has a buffer underrun prevention function (corresponding to "recording resumption device" described in claims).

The buffer underrun prevention function is a function for retaining information about an addendum of data when the amount of recording data stored in the buffer 37 has decreased to a predetermined level or less. Here, the term "information about an addendum of data" refers to information about an address where data are to be additionally recorded and information about a position in the sector of the optical disk 10 in which data are to be additionally recorded and a timing at which additional data are to be recorded. After processing for cooling the pickup 33 has been completed, recording of the data is resumed on the basis of the information about the addendum of the stored data.

The CPU 34 stops receiving data transmitted, to the buffer 37, from a host computer or the like connected to the optical information recording apparatus and performs control operation such that all the data stored in the buffer 37 are recorded on the optical disk 10, thereby effecting the buffer underrun prevention function. As mentioned above, the buffer underrun prevention function of the encoder 38 is utilized, whereby the RF signals can be connected together without interruption, as shown in FIG. 3B.

The pickup controller 39 is for generating a signal waveform to be used for adjusting the exposure time of the light beam 13 on the basis of the data signal encoded by the encoder 38. The pickup controller 39 effects switching between gains of the photodetector 33c.

The laser diode driver 40 is for controlling the laser diode 33a in accordance with the waveform of a signal generated by the pickup controller 39. The laser diode driver 40 receives the signal waveform output from the pickup controller 39 as a digital voltage signal and converts the signal into an analog drive current signal through digital-to-analog conversion, to thus control an emission output of the laser diode 33a.

The amplifier 41 is an amplifying device for amplifying the recording signal recorded in the optical disk 10 then the pickup 33 has read that recording signal. The amplifier 41 sends an error signal to the CPU 34 when a read error has arisen. The decoder 42 is a circuit which demodulates the recording signal that has been amplified by the amplifier 41, to thus generate reproduced data.

Here, during the operation for recording data on the optical disk 10, the CPU 34 stores, in the RAM 36, a relationship between the temperature of the pickup 33 acquired by the temperature sensor 33b by way of the pickup controller 39 and an emission output control value which has been input to the laser diode driver 40 by the pickup controller 39 and is employed for controlling an emission output of the laser diode 33a.

On the basis of the relationship, the CPU 34 corrects an emission output of the laser diode 33a generated after cooling of the pickup 33. Specifically, the CPU 34 extracts, from the RAM 36, an emission output control value corresponding to the temperature of the pickup 33 achieved after completion of the cooling operation. The thus-extracted emission output control value is input to the laser diode driver 40 by way of the pickup controller 39, thereby controlling an emission output of the laser diode 33a and resuming recording of the data.

When the operation for cooling the pickup 33 is performed, the CPU 34 rotates the spindle motor 11 at a constant angular velocity by way of the DSP controller 32 and the driver 31. The angular velocity is set such that no great gap arises between the rotational speed achieved during a recording operation and that achieved during a cooling operation. At this time, the CPU 34 performs control operation such that the laser diode driver 40 deactivates the power of the laser diode by way of the pickup controller 39. Further, the CPU 34 performs control operation such that the pickup 33 turns off tracking power and focusing power, by way of the pickup controller 39.

The CPU 34 shifts the pickup 33 to a position where the quantity of radiated heat becomes greater, by controlling the carriage 15. This position is a position where the quantity of radiated heat is determined to become maximum through a test or the like conducted beforehand. By way of an example, the position is located at a distance of about two-thirds the radius away from the center of the optical disk 10 (a position spaced about 40 mm away from the center when the radius of the optical disk 10 is 60 mm). The rotational speed achieved at this time is set to a value which is not greatly different from the rotational speed achieved at this position during recording operation. For instance, when changing from 2700 rpm to 1000 rpm in the radial direction from the center, the rotational speed achieved during the recording operation is close to the rotational speed achieved at a position which is about two-thirds the distance from the center in the radial direction, during the recording operation, and a rotational speed of 2000 rpm is set as the rotational speed for the cooling operation so that appropriate wind power can be supplied to the pickup 33. As a result, the pickup 33 avoids the heat radiating from the spindle motor, which is one of the heat sources, and the entirety of the pickup 33 can efficiently receive the wind power stemming from rotation of the optical disk 10. Here, the position at which the amount of radiated heat becomes maximum varies according to the structure of the optical information recording apparatus and the position of the heat source.

FIG. 5 is a view showing an example relationship between the temperature of the pickup 33 achieved during the operation for recording data and the emission output control value employed for controlling an emission output from the laser diode 33a. As illustrated, the value of the emission output control employed for recording data is stored in hexadecimal digits in conformance with the respective temperatures of the pickup 33. The CPU 34 extracts the emission output control value corresponding to the temperature of the pickup 33 achieved at the end of the cooling operation and resumes the data recording operation through use of the thus-extracted emission output control value.

Figure 6:
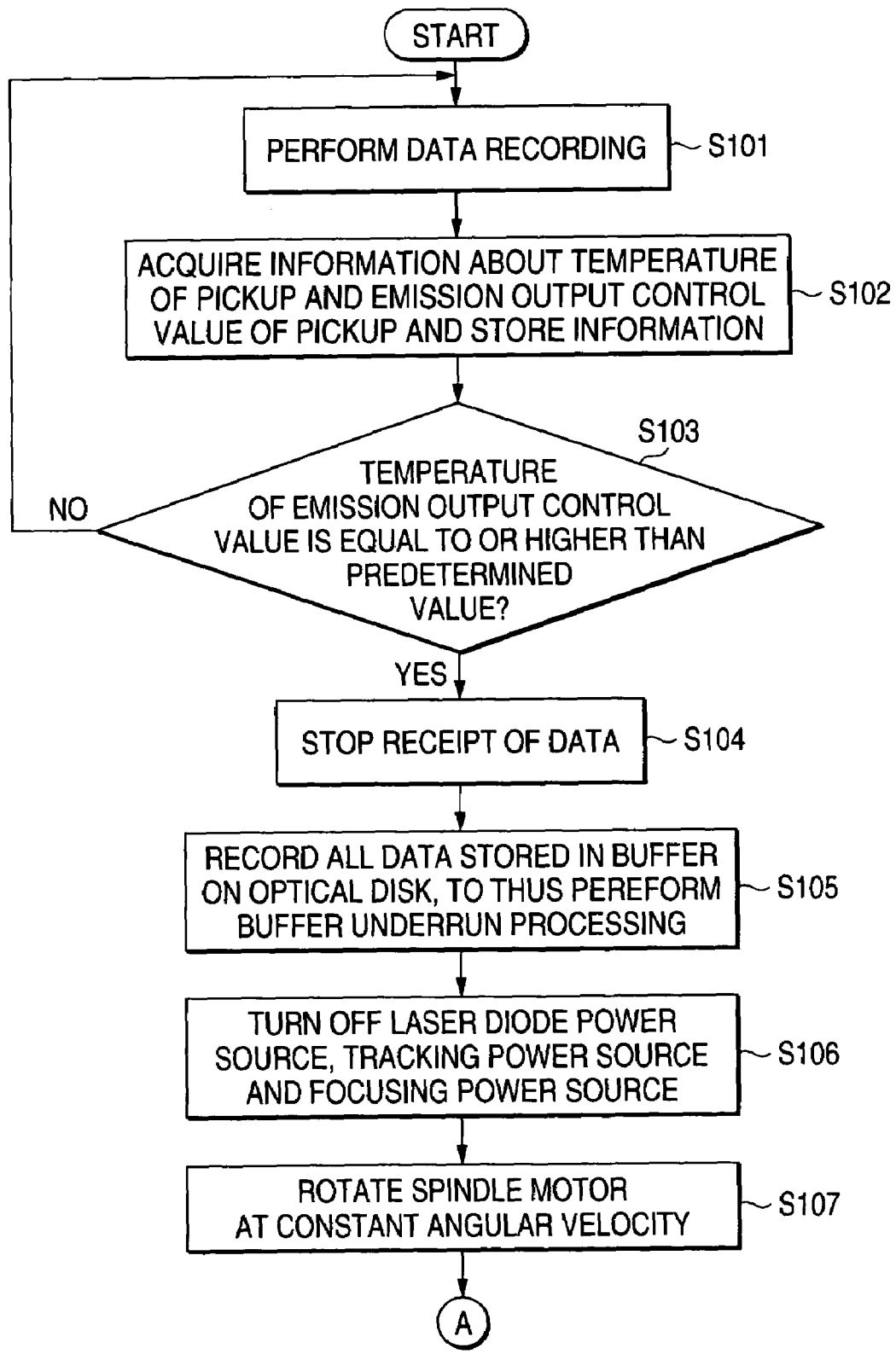
FIG. 6 is a flowchart (1) showing processing procedures of data recording operation controlled by a CPU of the optical information recording apparatus of the example.
Figure 7:
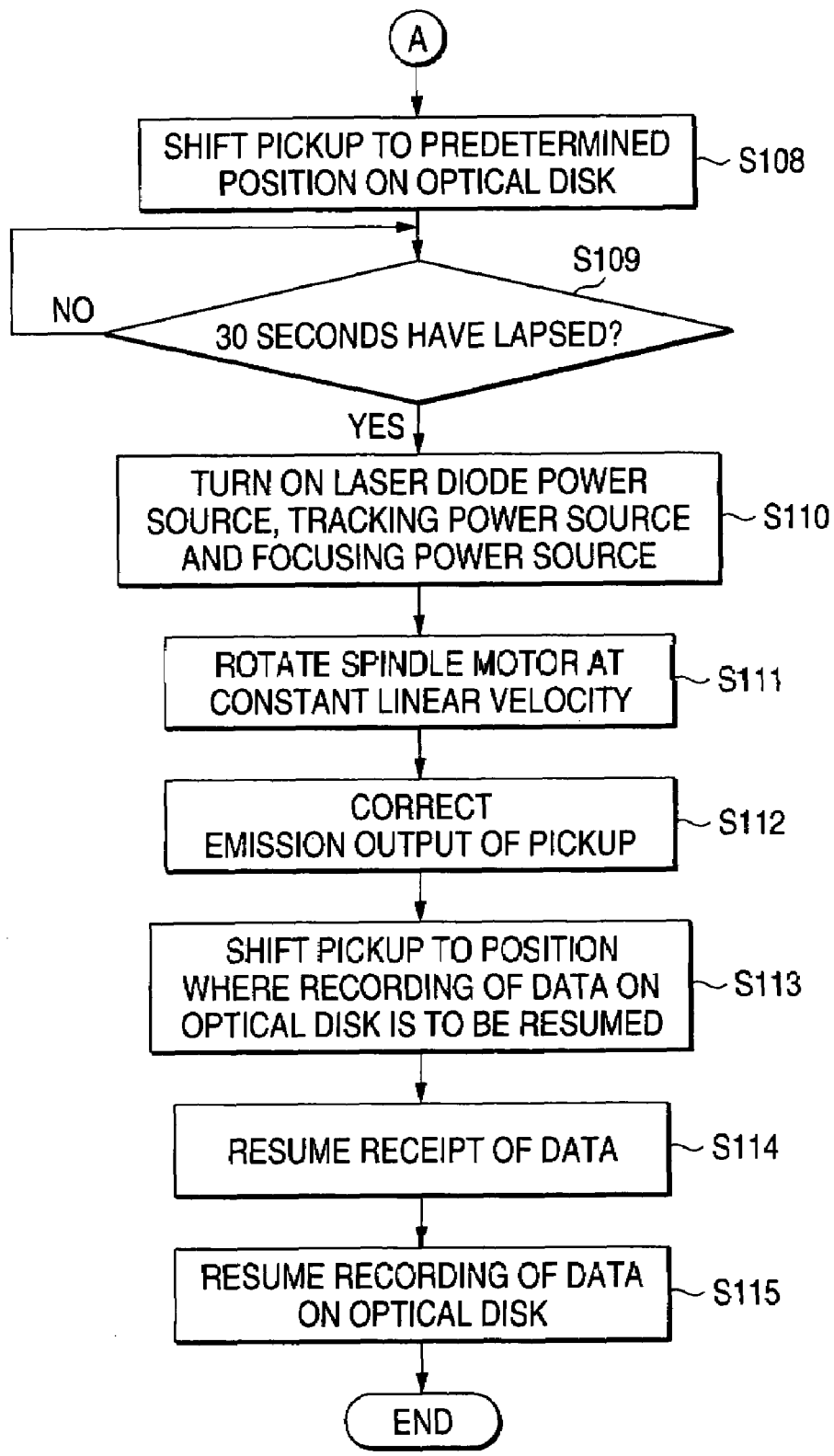
FIG. 7 is a flowchart (2) showing processing procedures of data recording operation controlled by a CPU of the optical information recording apparatus of the example.

Procedures for controlling the data recording operation controlled by the CPU 34 of the optical information recording apparatus of the example will now be described. FIGS. 6 and 7 show flowcharts (1) and (2) showing processing procedures of the data recording operation controlled by the CPU 34 of the optical information recording apparatus of the example.

As illustrated, the CPU 34 performs control operation such that the laser diode 33a emits the light beam 13 by way of the pickup controller 39 and the laser diode driver 40, thereby carrying out an operation for storing data in the optical disk 10 (step S101).

The CPU 34 acquires information about the temperature of the pickup 33 by way of the temperature sensor 33b every time data of a predetermined amount are recorded. The CPU 34 also acquires information about the emission output control value of the laser diode 33a input to the laser diode driver 40 from the pickup controller 39 and stores these pieces of information in the RAM 36 (step S102).

The CPU 34 determines whether or not the thus-acquired temperature is equal to or greater than the predetermined value that has been stored in the ROM 35 in advance or whether or not the emission output control value is equal to or greater than the predetermined value that has been stored in the ROM 35 in advance (step S103). When the thus-acquired temperature is less than the predetermined value and when the emission output control value is less than the predetermined value (when NO is selected in step S103), the data recording operation is performed continuously (step S101).

In relation to the temperature, the "predetermined value" is set on the basis of the rated temperature of the laser diode 33a or the rated temperature employed for stably actuating the pickup. As a result, radiation of the light beam at the rated temperature or higher can be prevented, whereby an increase in the life of the laser diode and stable operation of the pickup can be implemented. The "emission output control value" is set on the basis of the maximum output value of the laser diode 33a or the maximum emission output control value that the pickup controller 39 can give the laser diode driver 40 as an instruction. For instance, in the present example, the information recording apparatus is equipped with an 8-bit digital-to-analog converter, and the maximum emission output control value assumes an address "FFh" expressed in hexadecimal. As a result, the radiation output does not exceed the maximum value, and emission of the optimum light beam can be stably supplied. The "predetermined value" can also be set to a value having a certain extent of margin with respect to the previously-described predetermined value in consideration of a delay in commencement of the cooling operation.

When the thus-acquired temperature is equal to or higher than the predetermined level or when the emission output control value is equal to or higher than the predetermined value (when YES is selected in step S103), the CPU 34 controls the buffer 37 so as to stop receipt of the recording data transmitted from the unillustrated circuit on a previous stage (step S104) and records all the data stored in the buffer 37 to the optical disk 10, to thus empty out the buffer 37 and perform the buffer underrun processing (step S105). Specifically, in order to connect the RF signals together without interruptions when recording of the data is resumed, the CPU 34 stores, in the RAM 36, the information to be additionally stored in the encoder 38.

Subsequently, the CPU 34 controls the pickup controller 39, thereby deactivating the laser diode power source, the tracking power source, and the focusing power source (step S106). Further, the CPU 34 performs control operation such that the spindle motor 11 is rotated at a constant angular velocity by way of the DSP controller 32 and the driver 31 (step S107).

Subsequently, the CPU 34 shifts the carriage 15 such that the pickup 33 comes to a position where a high cooling effect is yielded, by way of the DSP controller 32 and the driver 31 (step S108). The CPU 34 waits until the pickup 33 has been cooled in that state and controls the pickup controller 39 after lapse of 30 seconds (when YES is selected in step S109), thereby activating the laser diode power source, the tracking power source, and the focusing power source (step S110). Here, the wait time is set to 30 seconds, but the present invention is not limited to this time. Any time can be adopted, so long as the time corresponds to a predetermined time.

Subsequently, the CPU 34 performs control operation such that the spindle motor 11 is rotated at a constant linear velocity, by way of the DSP controller 32 and the driver 31 (step S111). There is performed processing for correcting the emission output from the pickup 33 on the basis of the relationship between the temperature and emission output control value of the pickup 33, such as that shown as a way of example in FIG. 5 (step S112).

Subsequently, the CPU 34 shifts the carriage 15 such that the pickup 33 comes to a position where recording of the data stored through the buffer underrun processing pertaining to step S105 is to be resumed by way of the DSP controller 32 and the driver 31 (step S113).

Subsequently, in order to resume the operation for encoding the recording data, the CPU 34 controls the buffer 37 and the encoder 38 (step S114) and performs a control operation such that the laser diode 33a emits the light beam 13 by way of the pickup controller 39 and the laser diode driver 40, thereby resuming recording of the data in the optical disk 10 (step S115).

As has been described, according to the example, a determination is made as to whether to perform cooling operation, by determining whether the temperature of the pickup 33 or the emission output control value for controlling the emission output from the pickup 33 is equal to or higher than the predetermined value. When a determination is made that the cooling operation is to be performed, the pickup is cooled. Hence, an inappropriate increase in the temperature of the pickup 33 can be inhibited, thereby implementing stable operation of the pickup 33. Particularly, the laser diode 33a is used so as not to exceed the rated temperature or the maximum output value. Hence, an increase in the life of the laser diode and stable operation of the light beam can be realized.

According to the example, when processing proceeds to the cooling operation by stopping the data recording operation, the buffer underrun processing is performed, thereby storing information about the addendum of the data. When recording of the data is resumed, recording of the information is resumed in accordance with the information pertaining to the addendum of the data. Hence, the operation for recording data is resumed such that the RF signals become continuous, thereby inhibiting occurrence of a recording error.

According to the example, when the operation for cooling the pickup 33 is performed so as to resume recording of information on the optical disk 10, the emission output control value is selected according to the temperature of the pickup 33 at the time of resumption of the recording operation, thereby correcting the output from the pickup 33. Thus, an appropriate emission output taking into consideration the temperature achieved after cooling operation can be obtained at the time of resumption of the data recording operation.

The details of the example may also be realized in accordance with various modifications other than that mentioned previously. For instance, in the example, a relationship between the temperature of the pickup 33 employed at the time of recording of data and the emission output control value employed for controlling the emission output from the laser diode 33a is stored. The emission output is corrected on the basis of the relationship. However, the example is not limited to this arrangement. The temperature and emission output control value of the pickup 33, which are determined by a test or the like, may be stored as a numerical expression or a table beforehand, and the emission output may be corrected through use of the numerical expression or table.

As another method, the PCA provided on the inner periphery of the recording area of the optical disk 10 may be subjected to OPC, which involves performance of a recording test, thereby obtaining an appropriate emission output control value and correcting the emission output after cooling operation. In this case, there is no necessity for acquiring a relationship between the emission output control value and temperature of the pickup beforehand in order to correct an emission output, and hence step S102 of the steps described in the flowchart shown in FIG. 6 can be omitted.

In the example, cooling of the pickup 33 is performed for a predetermined period of time, but the present invention is not always limited to this example. Cooling may be continued until the temperature of the pickup 33 falls to the predetermined temperature. Under this arrangement, there may be a case where the temperature does not decrease quite smoothly. Hence, the information recording apparatus may be equipped with a timer and forcefully terminate the cooling operation after lapse of a predetermined period of time.

In the example, the pickup 33 is shifted to a location where a high heat radiating effect is yielded when the pickup 33 is cooled by rotating the spindle motor 11. However, the present invention is not limited to this arrangement. The pickup 33 may be cooled as a result of being reciprocally actuated Particularly, as a result of the pickup 33 being reciprocally actuated while the position where a high heat radiating effect is yielded is taken as a center, thereby cooling the pickup 33 more efficiently.

In the example, when the pickup 33 is cooled by rotating the spindle motor 11, the spindle motor 11 is rotated at an angular speed within a range employed during the course of recording of the data. Particularly, the rotational speed of the spindle motor 11 is maintained at the angular speed of the data recording operation achieved immediately before the cooling operation is performed; that is, the rotational speed achieved when recording of the data is interrupted, whereby the data recording operation can be resumed more smoothly.

The embodiment and examples have been described thus far, but the details provided above may also be implemented as another embodiment differing from that mentioned above. For instance, of the processing operations that have been described in connection with the embodiment, all or some of the processing operations that have been described as being performed automatically can be performed manually. Alternatively, all or some of the processing operations that have been described as being performed manually can be automatically performed by a known method. In addition, unless otherwise specified, arbitrary changes can be made to information about the processing procedures, the control procedures, the specific designations, various data sets, and parameters which have been described in the specification and drawings.

Respective constituent elements of the respective illustrated devices are functionally conceptual and do not always need to be physically configured as illustrated. Specifically, a specific pattern into which the devices are dispersed or integrated is not limited to the illustrated pattern. The devices may be configured by functionally or physically dispersing or integrating all or some of the devices on an arbitrary unit in accordance with various loads or service conditions. All or arbitrary portions of the processing functions performed by the respective devices may be implemented by a CPU, a program to be analyzed and executed by a CPU, or hardware based on wired logic.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An optical information recording apparatus comprising:
    an information recording section for recording information by emitting a beam on an optical recording medium;
    an emission output information acquisition device for acquiring the information about an emission output of the beam from the information recording section;
    a cooling determination device for determining whether to cool the information recording section, on the basis of the information about the emission output acquired by the emission output information acquisition device; and
    a cooling execution device for cooling the information recording section in accordance with a result of determination of the cooling determination device.

2. The optical information recording apparatus according to claim 1, wherein the optical information recording apparatus further includes an output correction device which stops recording of information on the optical recording medium when the cooling execution device cools the information recording section and which corrects an emission output of a beam from the information recording section when recording of information is resumed as a result of the cooling operation having been performed.

3. The optical information recording apparatus according to claim 2, wherein
    the optical information recording apparatus further includes a temperature information acquisition device for acquiring information about the temperature of the information recording section, and
    the output correction device corrects a beam output of the information recording section on the basis of information about the temperature of the information recording section that is acquired by the temperature information acquisition device after the cooling has been performed.

4. The optical information recording apparatus according to claim 3, wherein
    the output correction device stores a relationship between information about the temperature of the information recording section acquired by the temperature information acquisition device during the course of information recording operation and information about the emission output acquired by the emission output information acquisition device during the course of the information recording operation, and corrects the emission output of the information recording section, on the basis of the stored relationship and information about the temperature of the information recording section that is acquired by the temperature information acquisition device after the cooling operation.

5. The optical information recording apparatus according to claim 1, wherein
    the optical information recording apparatus further includes a temperature information acquisition device for acquiring information about the temperature of the information recording section, and
    the cooling determination device determines whether to cool the information recording section, on the basis of a determination as to which of at least one of information about an emission output acquired by the emission output information acquisition device and information about a temperature acquired by the temperature information acquisition device has satisfied a predetermined requirement.

6. The optical information recording apparatus according to claim 1, wherein
    the cooling execution device stores information about an addendum of the information obtained when recording of the information has been stopped, cools the information recording section, and additionally records the information on the basis of information about the addendum of the information when recording of the information on the optical recording medium is resumed.

7. The optical information recording apparatus according to claim 6, wherein the optical information recording apparatus further comprises a buffer for temporarily storing information to be recorded on the optical recording medium, and the cooling execution device stops transmission of the information to the buffer when the cooling operation is performed and stores information about the addendum of the information when a buffer under-run has arisen.

8. The optical information recording apparatus according to claim 1, wherein the cooling execution device performs cooling operation by stopping emission of an optical beam employed in recording the information.

9. The optical information recording apparatus according to claim 1, wherein the cooling execution device rotates the optical recording medium and shifts the information recording section to a predetermined location where the amount of heat radiated from the information recording section becomes equal to or greater than the quantity of heat radiated from the information recording section when recording of the information has been stopped, thereby performing cooling operation.

10. The optical information recording apparatus according to claim 8, wherein the cooling execution device cools the information recording section, by rotating the optical information recording medium at a rotational speed within a range employed during the course of an operation for recording information on the optical recording medium.

11. The optical information recording apparatus according to claim 10, wherein the rotational speed is substantially identical with the rotational speed set when recording of the information on the optical recording medium is resumed after the cooling execution device has cooled the information recording section.

12. An optical information recording apparatus comprising:

an information recording section for recording information by emitting a beam on an optical recording medium;

a temperature information acquisition device for acquiring the information about the temperature of the information recording section;

a cooling determination device for determining whether to cool the information recording section, on the basis of the information about the temperature acquired by the temperature information acquisition device;

a cooling execution device for cooling the information recording section in accordance with a result of determination of the cooling determination device; and an output correction device which corrects an emission output of a beam from the information recording section when recording of information on the optical recording medium is resumed after the cooling execution device has performed cooling of the information recording section.

13. The optical information recording apparatus according to claim 12, wherein the cooling execution device stores information about an addendum of the information obtained when recording of the information has been stopped, cools the information recording section, and additionally records the information on the basis of information about the addendum of the information when recording of the information on the optical recording medium is resumed.

14. The optical information recording apparatus according to claim 13, wherein the optical information recording apparatus further comprises a buffer for temporarily storing information to be recorded on the optical recording medium, and the cooling execution device stops transmission of the information to the buffer when the cooling operation is performed and stores information about the addendum of the information when a buffer under-run has arisen.

15. The optical information recording apparatus according to claim 12, wherein the cooling execution device performs cooling operation by stopping emission of an optical beam employed in recording the information.

16. The optical information recording apparatus according to claim 12, wherein the cooling execution device rotates the optical recording medium and shifts the information recording section to a predetermined location where the amount of heat radiated from the information recording section becomes equal to or greater than the quantity of heat radiated from the information recording section when recording of the information has been stopped, thereby performing cooling operation.

17. The optical information recording apparatus according to claim 15, wherein the cooling execution device cools the information recording section, by rotating the optical information recording medium at a rotational speed within a range employed during the course of an operation for recording information on the optical recording medium.

18. The optical information recording apparatus according to claim 17, wherein the rotational speed is substantially identical with the rotational speed set when recording of the information on the optical recording medium is resumed after the cooling execution device has cooled the information recording section.

* * * * *